June 13, 1939.  A. W. SIZER  2,162,647

MOLDING MACHINE FOR PLASTIC SUBSTANCES

Filed Dec. 13, 1938    3 Sheets-Sheet 1

Inventor
Albert William Sizer
by
Attorney

Albert William Sizer, Inventor by Mason, Fenwick & Lawrence, Attorney

Patented June 13, 1939

2,162,647

UNITED STATES PATENT OFFICE 2,162,647

MOLDING MACHINE FOR PLASTIC SUBSTANCES

Albert William Sizer, Hessle, Kingston upon Hull, England

Application December 13, 1938, Serial No. 245,525
In Great Britain November 28, 1938

3 Claims. (Cl. 107—8)

The present invention relates to an improved molding machine for the molding of cakes, pellets or the like from plastic material such for instance as the manufacture of cakes or pellets from meals or meal mixtures and of the type in which the meal is fed to a space between a roller and a die plate moving relatively to one another so that the meal is forced through the perforations in the die plate and is cut off in the form of cakes or pellets on the opposite side thereof.

According to the present invention means are provided to drive one or more rollers oppositely to a die plate usually at equal peripheral speeds.

Means may be provided to vary the quantity of meal fed per unit time to the area of the die plate in advance of the cooperating roller.

The invention is more particularly described with reference to the accompanying drawings in which:—

Figure 1:
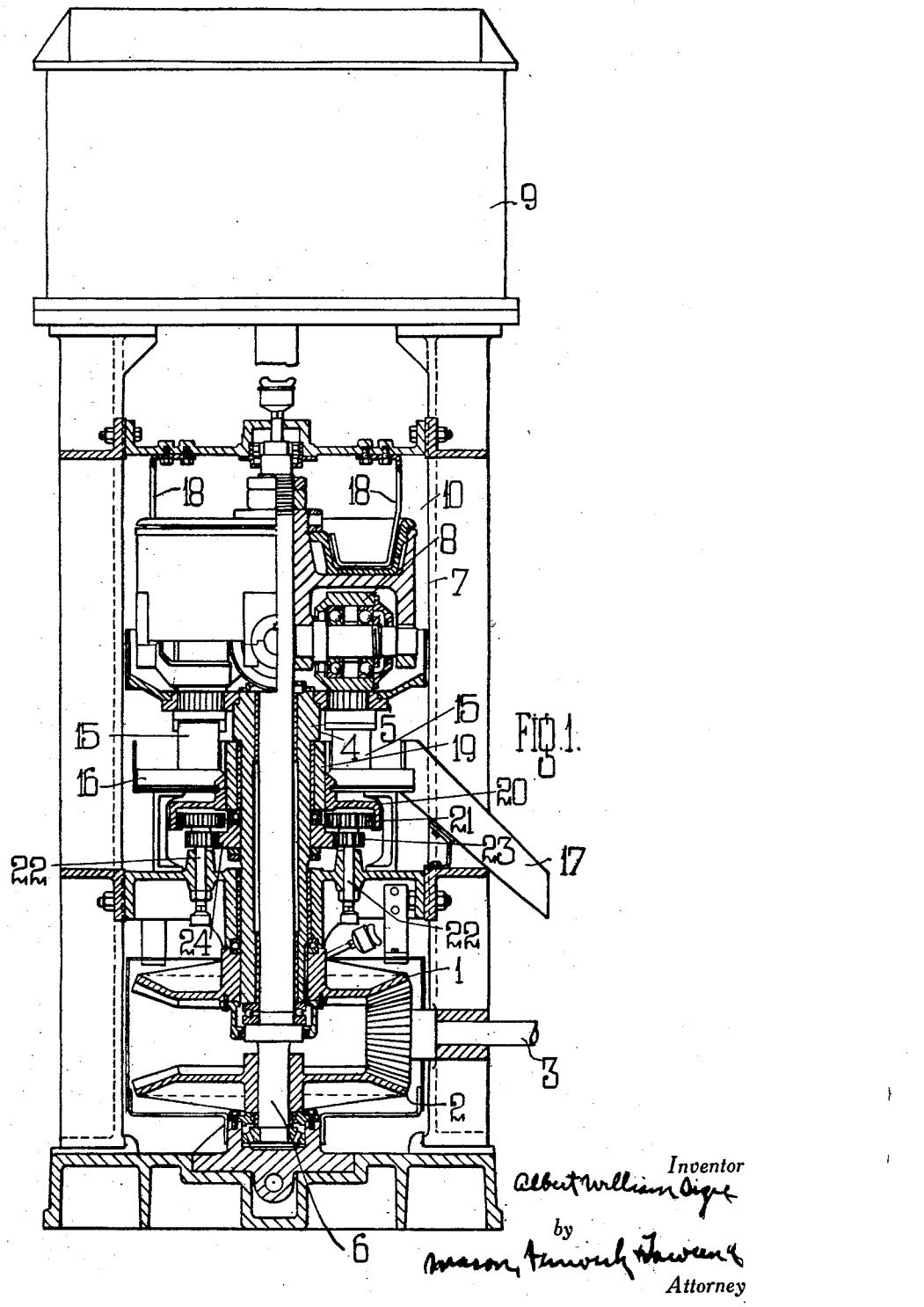
Figure 1 is a side elevation of one form of construction.
Figure 2:
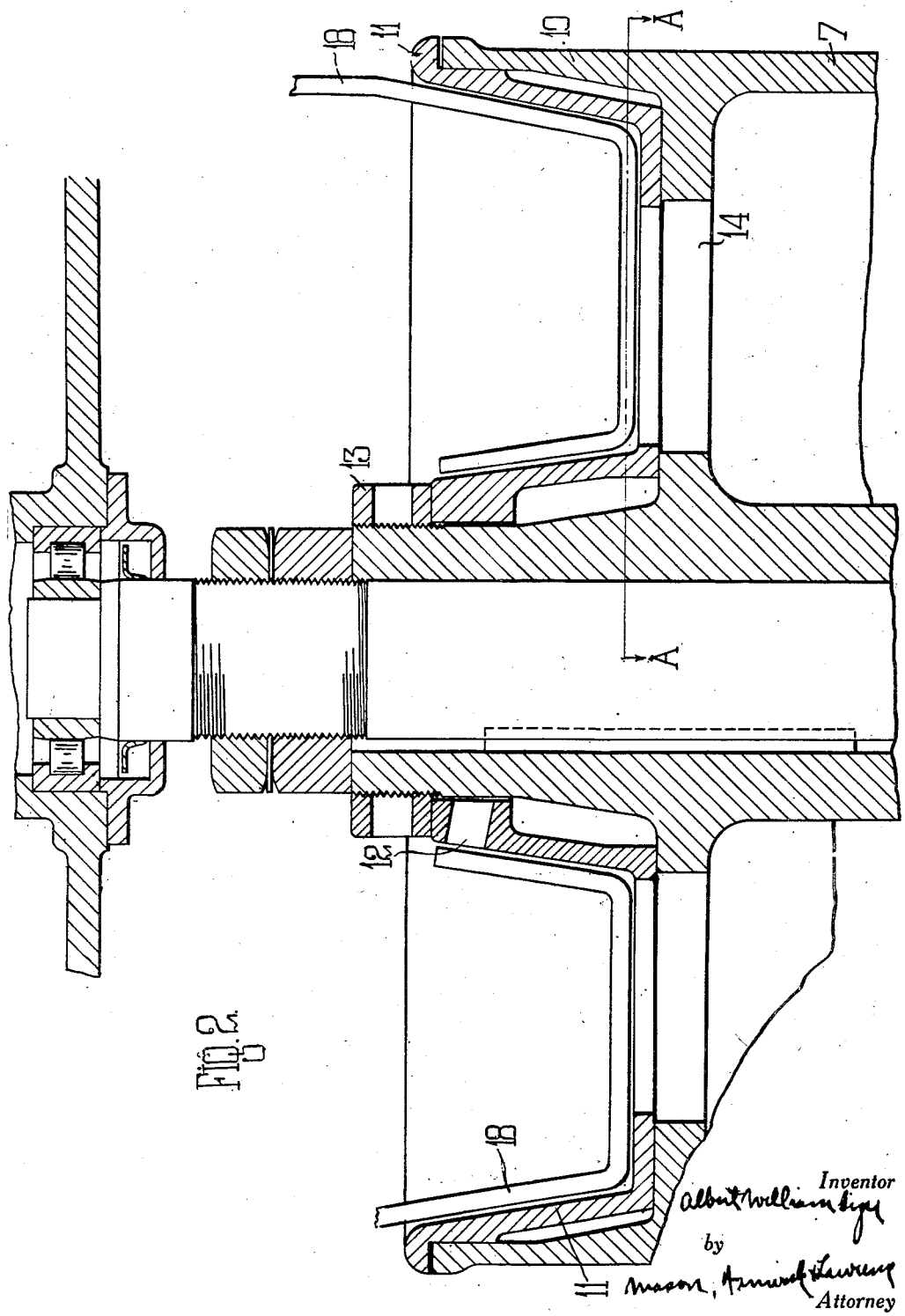
Figure 2 is a detailed view on a large scale showing the feed mechanism.
Figure 3:
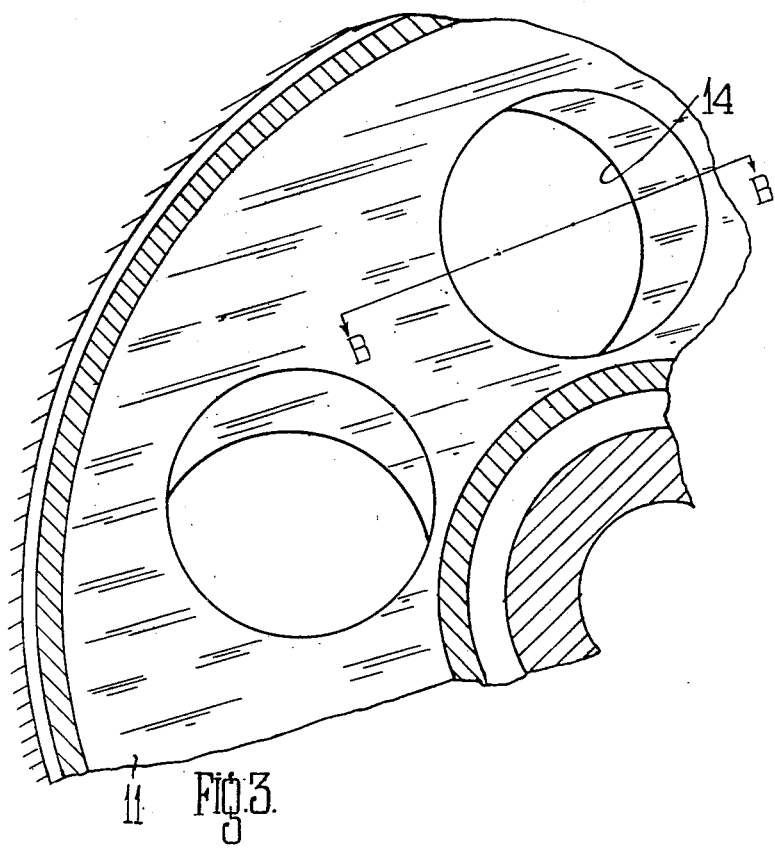
Figure 3 is a plan view of the line A—A of Figure 2.
Figure 4:
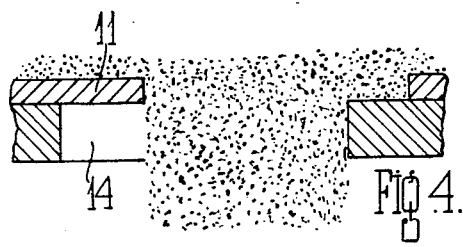
Figure 4 is a section of the line B—B of Figure 3.

A pair of bevel wheels 1, 2 are driven from a common driving shaft 3 in opposite directions one bevel wheel 1 being keyed to sleeve 4 for driving a die plate 5 in one direction of rotation whilst the bevel wheel 2 is keyed to a shaft 6 driving a spider 7 carrying bearings for a number of rollers 8 to rotate this in the opposite direction to the die plate 5.

Meal from a kettle 9 passes to a trough 10 formed in the upper part of the spider 7 which trough has holes 14 which may be masked to a greater or lesser extent by a ported masking plate 11 which has tommy holes 12 in it so that on the release of a locking ring 13 this plate 11 can be turned to any desired position of adjustment whereby the amount of meal passing through the holes 14 can be adjusted as desired and thus the feed to the die plate ahead of any individual roller 8 can be adjusted to suit the cross sectional area of the perforations in the die plate 5 cooperating therewith. Fixed stirrer bars or strakes 18 serve to assist the feeding of the meal through the holes 14.

The die plate 5 further cooperates with rotating cutting blades 15 for severing the cakes or pellets which can then fall upon a tray 16 and be delivered down a chute 17. The blades 15 are mounted on a sleeve 19 carrying an internally toothed ring 20 driven by toothed wheel 21 on a spindle 22 carrying also toothed wheel 23 driven by a toothed ring 24 keyed to the sleeve 4.

Normally the spider 7 and die plate 5 will be rotated in opposite directions at equal speeds, but if desired they may be rotated in opposite directions at different speeds.

I declare that what I claim is:

1. A molding machine for plastic substances comprising in combination an annular die plate, a sleeve driving said die plate, a roller in rolling contact with one side of said die plate, a cage carrying said roller, a driving shaft guided coaxially in said sleeve and driving said cage, a common driving means for said shaft and said sleeve, means to feed meal to the die plate ahead of said roller and means on the opposite side of said die plate to sever extruded meal in the form of pellets.

2. A molding machine for plastic substances comprising in combination an annular die plate, a sleeve driving said die plate, a roller in rolling contact with one side of said die plate, a cage carrying said roller, a driving shaft guided coaxially in said sleeve and driving said cage, a common driving means for said shaft and said sleeve, a trough carried on said cage and having an opening in its base for the feeding of meal ahead of said roller and a fixed scraper cooperating with the base of said trough.

3. A molding machine for plastic substances comprising in combination an annular die plate, a sleeve driving said die plate, a roller in rolling contact with one side of said die plate, a cage carrying said roller, a driving shaft guided coaxially in said sleeve and driving said cage, a common driving means for said shaft and said sleeve, a trough carried on said cage and having an opening in its base to feed meal to the die plate ahead of said roller, a perforated masking plate carried on said trough and adjustable relatively thereto to control the size of said opening, and a fixed scraper cooperating with said masking plate.

ALBERT WILLIAM SIZER.